H. W. BRANDT.
PROTECTOR FOR BEEHIVES AND THE LIKE.
APPLICATION FILED JAN. 2, 1918.
1,361,361. Patented Dec. 7, 1920.
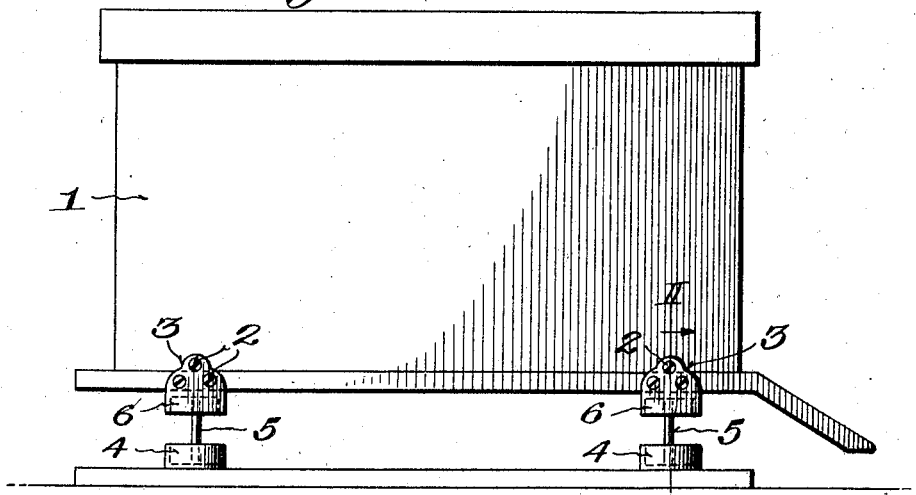
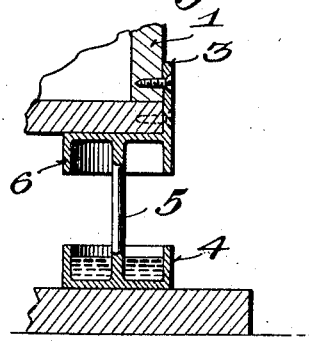
Witness
Chas. L. Griesbauer.
Inventor
Howard W. Brandt
by Percy B. Hills
Attorney

UNITED STATES PATENT OFFICE.

HOWARD W. BRANDT, OF LAWYERS, VIRGINIA.

PROTECTOR FOR BEEHIVES AND THE LIKE.

1,361,361.   Specification of Letters Patent.   Patented Dec. 7, 1920.

Application filed January 2, 1918. Serial No. 209,940.

*To all whom it may concern:*

Be it known that I, HOWARD W. BRANDT, a citizen of the United States, residing at Lawyers, county of Campbell, State of Virginia, have invented certain new and useful Improvements in Protectors for Beehives and the like, of which the following is a specification.

My invention relates to means for protecting articles, such as bee-hives and the like, from the encroachment of insects or vermin, and has for its object to provide a simple means for accomplishing this result, which readily may be attached to the article to be protected, and also will afford means for shielding the protecting medium.

These objects I accomplish in the manner and by the means hereinafter described and claimed, reference being had to the accompanying drawing, in which:—

Figure 1 is a side elevation of a bee-hive supported by one form of my improved construction.

Fig. 2 is a detail vertical sectional view, taken on the line II—II of Fig. 1.

Similar numerals of reference denote corresponding parts in the several views.

In the said drawing, the reference numeral 1 denotes a bee-hive or other similar structure, the same having attached thereto by means of screws 2 one of my improved supports, said screws passing through a vertical plate 3 formed integral with the upper portion of said support. The support comprises a base cup 4, having projecting upwardly and centrally therefrom a stem 5 which carries at its upper end an inverted cup 6, said stem 5 being formed integral with said cups 4 and 6. As shown in Fig. 2, the plate 3 is formed integral with one side of the upper cup 6. In use the lower cup 4 is to be filled with any suitable liquid or other substance, over or through which insects or vermin will not pass, the result being that as the hive or other article is supported entirely by these cups, said hive will be protected most thoroughly against insects or vermin. The inverted cup 6 above the cup 4 performs an important function in that it shields said cup 4 and its contents to a considerable extent from ingress of moisture, dirt and the like, and in that respect protects the contents of said cup 4.

I wish it to be understood that my improved article is capable of being reversed so that the cup 4 would become the protector, while the cup 6 would become the receptacle. When so used the side plate 3 could be screwed to the base, and the beehive or other article supported by the cup 4.

A further use to which I contemplate applying my invention is in connection with poultry houses to prevent the same from becoming infected with lice and similar vermin. And in this connection I contemplate not only supporting the poultry house bodily by means of my improved article, but also may support the roost poles within the poultry house thereon.

Having thus described my invention, what I claim as new and desire to secure by Letters Patent, is:—

A support for beehives and the like, comprising a cup adapted to receive a substance preventing the passage of vermin, a shield disposed over said cup, a central stem uniting said cup and shield, and a vertically disposed plate formed integral with said shield and projecting upwardly at one side thereof and affording a means for attachment of the device to the article to be supported.

In testimony whereof I have hereunto affixed my hand, this 28th day of December, 1917.

HOWARD W. BRANDT.